US008823815B1

(12) United States Patent
Sekimoto (10) Patent No.: US 8,823,815 B1
(45) Date of Patent: Sep. 2, 2014

(54) CAMERA MODULE (75) Inventor: Yoshihiro Sekimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/345,858

(22) PCT Filed: Aug. 17, 2012

(86) PCT No.: PCT/JP2012/070919
§ 371 (c)(1),
(2), (4) Date: Mar. 19, 2014

(87) PCT Pub. No.: WO2013/046996
PCT Pub. Date: Apr. 4, 2013

(30) Foreign Application Priority Data

Sep. 26, 2011 (JP) .................................. 2011-209649

(51) Int. Cl.
H04N 5/228 (2006.01)
H04N 5/225 (2006.01)
H04N 5/232 (2006.01)

(52) U.S. Cl.
CPC ................................. H04N 5/23287 (2013.01)
USPC ...................................... 348/208.99; 348/374

(58) Field of Classification Search
USPC .................. 348/208.1–208.99, 357, 273–276
See application file for complete search history.

(56) References Cited

U.S. PATENT DOCUMENTS

| 7,161,621 | B2 * | 1/2007 | Kai et al. .................. 348/208.11 |
| 8,238,736 | B2 * | 8/2012 | Tsuruta et al. .................. 396/55 |
| 8,279,293 | B2 * | 10/2012 | Noto .......................... 348/208.7 |
| 8,611,735 | B2 * | 12/2013 | Sekimoto ........................ 396/55 |
| 2006/0275032 | A1 * | 12/2006 | Hong et al. ..................... 396/439 |
| 2008/0158412 | A1 * | 7/2008 | Tagome et al. ............... 348/374 |
| 2011/0096178 | A1 * | 4/2011 | Ryu et al. .................... 348/208.2 |
| 2012/0154614 | A1 | 6/2012 | Moriya et al. |
| 2012/0229926 | A1 | 9/2012 | Wade et al. |
| 2013/0039640 | A1 | 2/2013 | Sekimoto |

FOREIGN PATENT DOCUMENTS

| JP | 2006-228310 | 8/2006 |
| JP | 2011-65140 | 3/2011 |
| JP | 2011-113009 | 6/2011 |

OTHER PUBLICATIONS

International Search Report for PCT/JP2012/070919, mailed Nov. 20, 2012.
Foreign-language Written Opinion of the International Searching Authority for PCT/JP2012/070919, mailed Nov. 20, 2012.

* cited by examiner

Primary Examiner — Roberto Velez
Assistant Examiner — Tuan Le
(74) Attorney, Agent, or Firm — Nixon & Vanderhye, P.C.

(57) ABSTRACT

A camera module (50) is provided with a suspension wire (16) and an AF spring. The spring constant of the suspension wire (16) and the AF spring is set so that the maximum value of stress specified according to the degree of deformation in the longitudinal direction of the suspension wire (16) does not exceed the buckling stress or the yield stress of the suspension wire (16) when a movable section moves within a moving range.

3 Claims, 7 Drawing Sheets

CAMERA MODULE

This application is the U.S. national phase of International Application No. PCT/JP2012/070919, filed 17 Aug. 2012, which designated the U.S. and claims priority to JP Application No. 2011-209649, filed 26 Sep. 2011, the entire contents of each of which are hereby incorporated by reference.

TECHNICAL FIELD

The present invention relates to a camera module mounted in electronic devices such as mobile phones. Particularly, the present invention relates to a camera module having an image stabilizing function.

BACKGROUND ART

In recent years, mobile phones including camera modules account for the majority of types of mobile phones. Since such a camera module has to be housed in a mobile phone, there has been a demand for a camera module that is smaller and lighter than digital cameras.

Further, there is an increasing number of cases where a camera module that provides an automatic focusing (AF) function by means of a lens drive device is mounted in an electronic device such as a mobile phone. There are various types of lens drive devices including a type utilizing a stepping motor, a type utilizing a piezoelectric element, and a type utilizing a VCM (Voice Coil Motor). Such lens drive devices are currently commercially available.

On the other hand, in such a situation that the camera module having the automatic focusing function has become common, an image stabilizing function has been attracting rising attention as a next featuring function of a camera module. The image stabilizing function has been widely used in digital cameras and movies, whereas the image stabilizing function has rarely been used in mobile phones. This is because there are problems such as a size issue for employing the image stabilizing function in mobile phones. However, proposals for a novel structure of an image stabilizing mechanism that can be downsized are currently arising. Accordingly, it is predictable that camera modules for mobile phones having an image stabilizing function increase in the future.

Patent Literature 1 describes a "barrel shift" image stabilizing device as an image stabilizing mechanism. The image stabilizing device described in Patent Literature 1 is an image stabilizing device arranged to correct camera shake, by moving an entire automatic focusing lens drive device or a movable section thereof in a first direction and a second direction which are orthogonal to an optical axis and that are orthogonal to each other and thereby moving a lens barrel along the optical axis, the image stabilizing device including a focus coil and a permanent magnet which is disposed on an outer side of the focus coil in a radical direction of the focus coil with respect to the optical axis while facing the focus coil. The image stabilizing device includes (i) a base disposed apart from a bottom surface of the automatic focusing lens drive device, (ii) a plurality of suspension wires each of which has one end fixed to an outer periphery of the base, extends along the optical axis, and supports the entire automatic focusing lens drive device or the movable section thereof in such a manner that the entire automatic focusing lens drive device or the movable section thereof can rock in the first direction and the second direction, and (iii) a camera shake correcting coil disposed to face the permanent magnet.

Patent Literature 2 describes a technique for improving impact resistance of an image stabilizing device in which suspension wires as described in Patent Literature 1 are used. Patent Literature 2 describes a lens drive device including (i) a first supporting body that holds a lens and is capable of moving in a direction of an optical axis of the lens, (ii) a second supporting body that holds the first supporting body in such a manner that the first supporting body can move in the direction of the optical axis, (iii) a fixed body that holds the second supporting body in such a manner that the second supporting body can move in directions that are substantially orthogonal to the direction of the optical axis, (iv) a first drive mechanism for driving the first supporting body in the direction of the optical axis, (v) a second drive mechanism for driving the second supporting body in a predetermined first direction substantially orthogonal to the direction of the optical axis, (vi) a third drive mechanism for driving the second supporting body in a second direction substantially orthogonal to the direction of the optical axis and to the first direction, (vii) a plurality of wires for connecting the second supporting body and the fixed body, and (viii) a buckling prevention member for preventing buckling of the plurality of wires. The wires are formed linearly. The second supporting body is supported by the fixed body by means of the wires in such a manner that the second supporting body can move in the directions substantially orthogonal to the optical axis. The buckling prevention member is made of an elastic material and is elastically deformed in the direction of the optical axis by a force smaller than the buckling load on the wires.

CITATION LIST

Patent Literatures

Patent Literature 1
Japanese Patent Application Publication, Tokukai, No. 2011-65140 A (Publication Date: Mar. 31, 2011)
Patent Literature 2
Japanese Patent Application Publication, Tokukai, No. 2011-113009 A (Publication Date: Jun. 9, 2011)

SUMMARY OF INVENTION

Technical Problem

In the technique described in Patent Literature 1, drop impact resistance is not taken into consideration. In a case where a high impact is applied to the image stabilizing device due to a drop etc., a suspension wire may be permanently deformed due to a strain on the suspension wire or be buckled due to compression of the suspension wire. This is because a long and thin metallic suspension wire is flexible in a direction perpendicular to a longitudinal direction of the suspension wire, whereas deformation tolerance of the suspension wire to stretch and contraction is extremely small in a longitudinal direction of the suspension wire.

According to the technique described in Patent Literature 2, even when the buckling prevention member employed is made of an elastic material that is elastically deformed by a force smaller than the buckling load on the wires, it may be difficult to successfully prevent the suspension wires from being buckled and permanently deformed due to a drop impact or the like. This is because (i) an elastic material is essentially deformed when force is applied thereon and (ii) Hooke's law works within an elastic deformation region, and therefore, the suspension wires may be deformed even when the buckling prevention member described in Patent Literature 2 is used. Depending on a deformation amount of the suspension wires, the suspension wires may be buckled or permanently deformed. That is, it is necessary to set a condition for reducing the deformation amount of the suspension wires in order to prevent buckling and permanent deformation.

The present invention has been made in view of the foregoing problems, and a main object of the present invention is (i) to successfully prevent buckling and permanent deformation of suspension wires in a camera module including an image stabilizing mechanism which is provided with the suspension wires connected to an elastic body and (ii) thereby to ensure drop impact resistance of the camera module.

Solution to Problem

In order to attain the object above, the camera module of the present invention is a camera module which has an image stabilizing function including: an image pickup element that converts an optical signal into an electric signal; and a lens drive device for driving an image pickup lens through which light enters the image pickup element, the image pickup lens being driven in a direction of an optical axis and two axial directions perpendicular to the optical axis, the lens drive device including: a movable section including the image pickup lens; a fixed section surrounding the movable section; driving means for driving the movable section in a direction perpendicular to the optical axis of the image pickup lens; a suspension wire that extends parallel or obliquely to the optical axis and supports the movable section so that the movable section is driven in the direction perpendicular to the optical axis; an elastic body which is connected to at least one end of the suspension wire and prevents buckling and permanent deformation of the suspension wire; and a locking member that defines a moving range of the movable section in the direction of the optical axis, the suspension wire and the elastic body each having a spring constant that is set so that a maximum value of stress does not exceed buckling stress and yield stress of the suspension wire, the maximum value of stress being defined by a deformation amount in a longitudinal direction of the suspension wire at the time when the movable section moves in the moving range.

According to the above configuration, the locking member defines the moving range of the movable section in the direction of the optical axis, so that a total deformation amount in this moving range is divided and allotted to a longitudinal direction of the suspension wire and the elastic body, at a ratio corresponding to respective spring constant of the suspension wire and the elastic body. This makes it possible to reduce the deformation amount of the suspension wire. Furthermore, it is possible to calculate stress defined by the deformation amount of the suspension wire in the longitudinal direction. That is, by setting the ratio of the respective spring constants of the suspension wire and the elastic body to an appropriate value, it is possible to prevent the stress defined by the deformation amount in the longitudinal direction of the suspension wire from exceeding the buckling stress and yield stress of the suspension wire.

Because the configuration above makes it possible to successfully prevent buckling and permanent deformation of the suspension wire, it is possible to more preferably ensure drop impact resistance.

Advantageous Effects of Invention

The camera module of the present invention is a camera module which has an image stabilizing function including: an image pickup element that converts an optical signal into an electric signal; and a lens drive device for driving an image pickup lens through which light enters the image pickup element, the image pickup lens being driven in a direction of an optical axis and two axial directions perpendicular to the optical axis, the lens drive device including: a movable section including the image pickup lens; a fixed section surrounding the movable section; driving means for driving the movable section in a direction perpendicular to the optical axis of the image pickup lens; a suspension wire that extends parallel or obliquely to the optical axis and supports the movable section so that the movable section is driven in the direction perpendicular to the optical axis; an elastic body which is connected to at least one end of the suspension wire and prevents buckling of the suspension wire; and a locking member that defines a moving range of the movable section in the direction of the optical axis, the suspension wire and the elastic body each having a spring constant that is set so that a maximum value of stress does not exceed buckling stress and yield stress of the suspension wire, the maximum value of stress being defined by a deformation amount in a longitudinal direction of the suspension wire at the time when the movable section moves in the moving range. This advantageously makes it possible to prevent buckling and permanent deformation of the suspension wire and thereby to ensure drop impact resistance.

DESCRIPTION OF EMBODIMENTS

Embodiment 1

Figure 1:
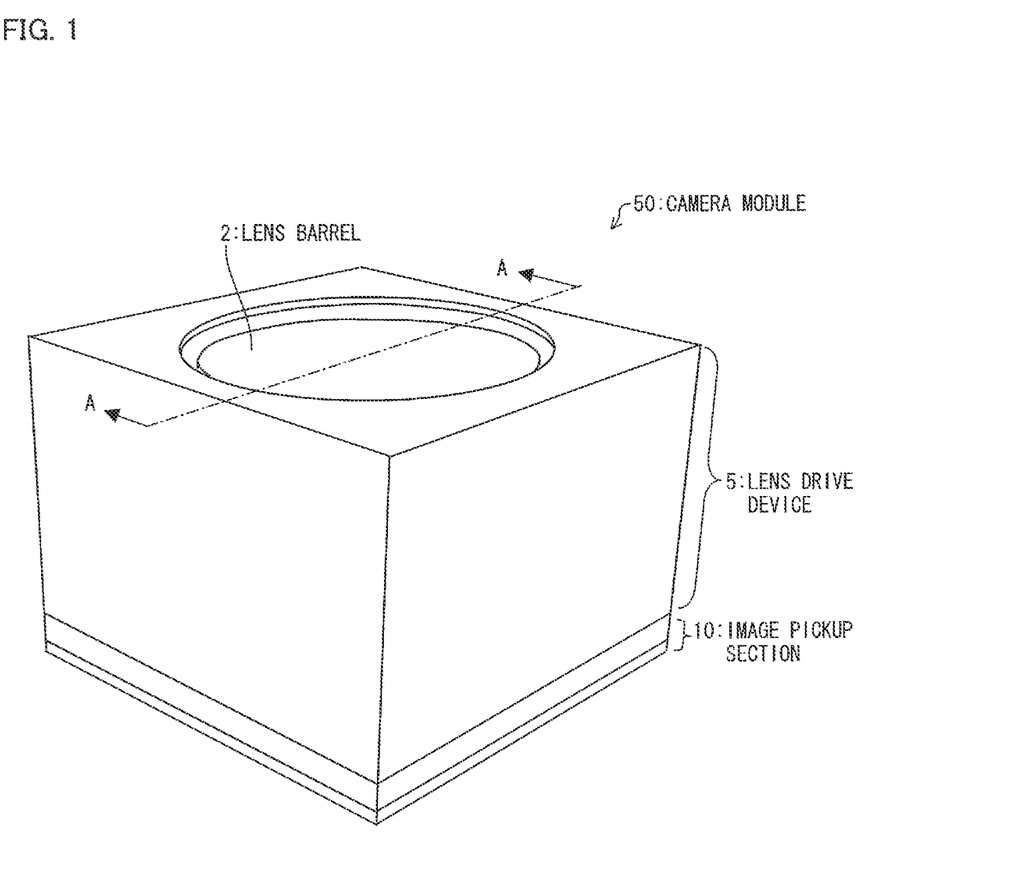
FIG. 1 is a perspective view schematically illustrating a configuration of a camera module of one embodiment of the present invention.
Figure 2:
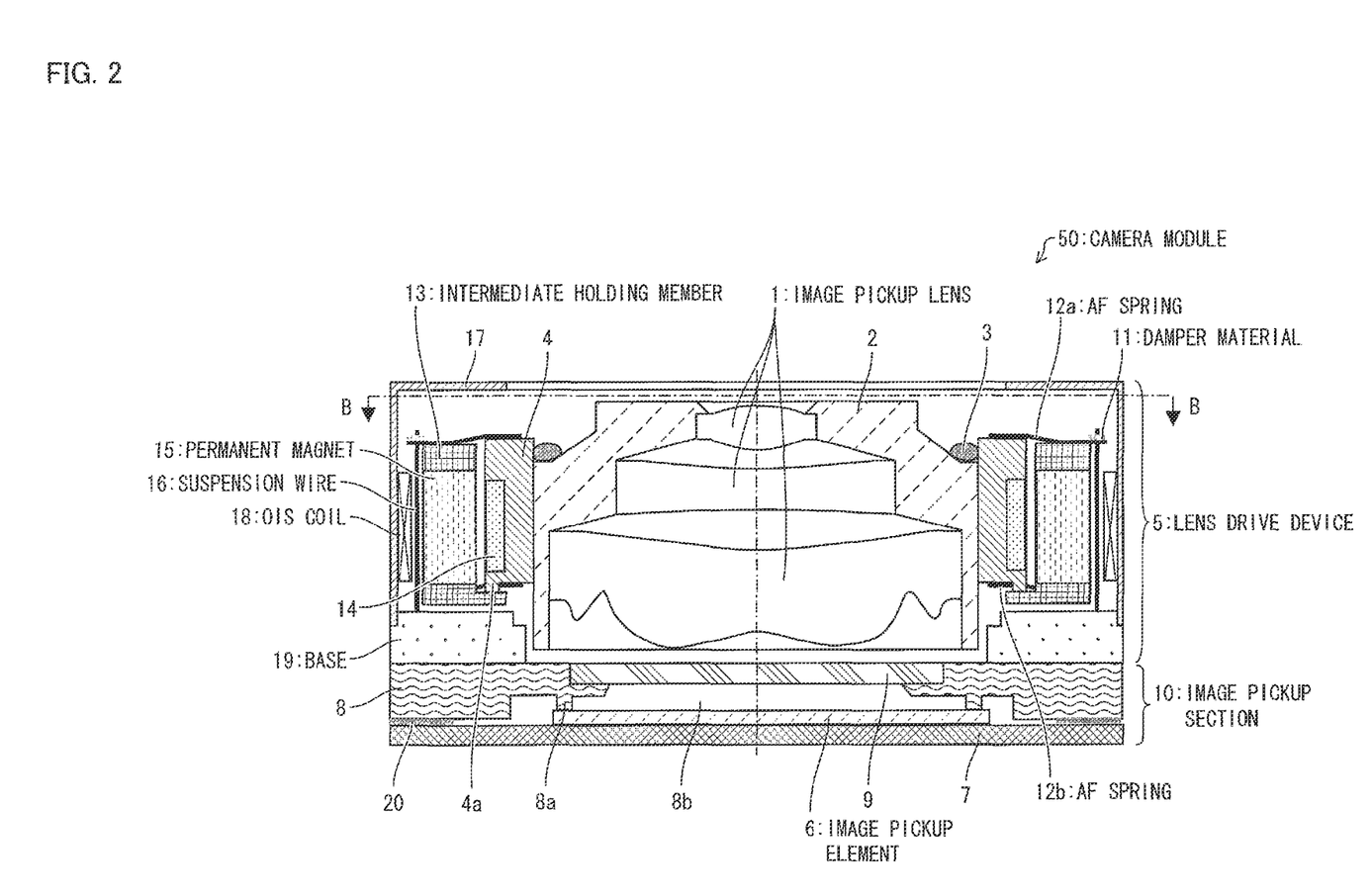
FIG. 2 is a cross-sectional view schematically illustrating a configuration of the camera module of one embodiment of the present invention.
Figure 3:
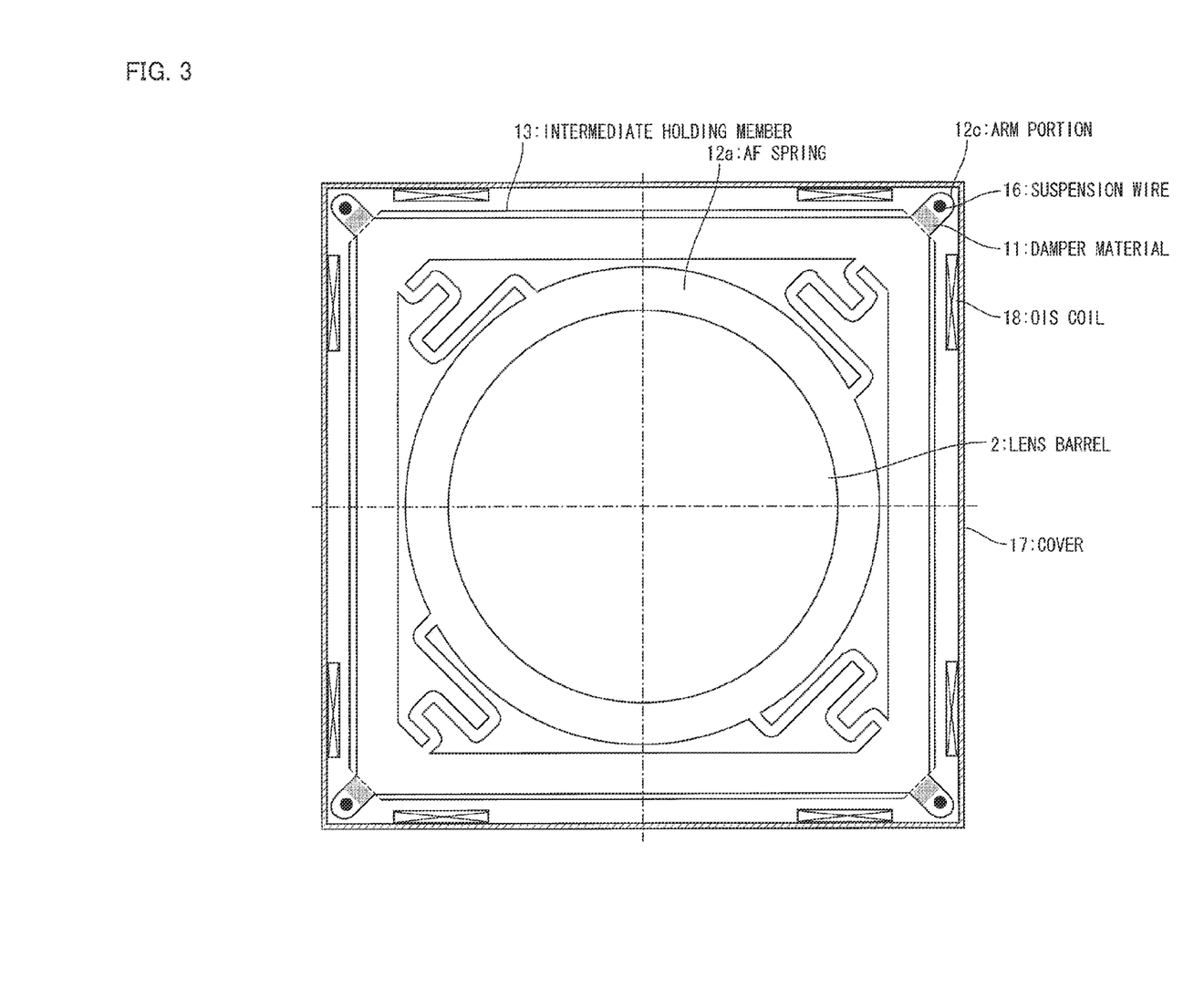
FIG. 3 is a cross-sectional view schematically illustrating a configuration of the camera module of one embodiment of the present invention.

FIG. 1 is a perspective view schematically illustrating a configuration of a camera module 50 of one embodiment (Embodiment 1) of the present invention. FIG. 2 is a cross-sectional view taken along line A-A in a direction of arrows of FIG. 1 schematically illustrating a configuration of the camera module 50 of Embodiment 1. FIG. 3 is a cross-sectional view taken along line B-B in a direction of arrows of FIG. 2 schematically illustrating a configuration of the camera module 50 of Embodiment 1.

(Camera Module)

The camera module 50 includes an image pickup lens 1, a lens barrel 2 in which the image pickup lens 1 is housed, and a lens holder 4 fixing therein the lens barrel 2 with use of an adhesive 3 (see FIGS. 1 to 3).

The camera module 50 further includes (i) a lens drive device 5 for driving the image pickup lens 1 in a direction of an optical axis and two axial directions perpendicular to the optical axis and (ii) an image pickup section 10 which includes an image pickup element 6 that carries out photoelectric conversion of light which has passed through the image pickup lens 1, a substrate 7 on which the image pickup element 6 is placed, a sensor cover 8 that covers the image pickup element 6, and a glass substrate 9. The lens drive device 5 and the image pickup section 10 are stacked in the direction of the optical axis. The lens drive device 5 is covered with a cover 17.

Note that, for convenience, in the following description, an image pickup lens 1 side is referred to as an upper side while an image pickup element 6 side is referred to as a lower side. However, this does not mean to define top and bottom directions at the time when the camera module 50 is actually used. For example, the upper and lower directions may be reversed.

(Lens Drive Device)

The lens drive device 5 includes AF springs 12a and 12b, an intermediate holding member 13, an AF coil 14, a permanent magnet 15, suspension wires 16, OIS coils 18, and a base 19.

The lens holder 4 is supported by two upper and lower AF springs (plate spring members) 12a and 12b so that the lens holder 4 is driven in the direction of the optical axis relative to the intermediate holding member 13. With respect to an outer periphery of the lens holder 4, the AF coil 14 is fixed. The permanent magnet 15 is fixed to the intermediate holding member 13. This permanent magnet 15 serves both as a permanent magnet for AF drive and a permanent magnet for correcting camera shake. However, two permanent magnets respectively for AF drive and for correcting camera shake may be separately provided. The lens holder 4 has a protrusion 4a which is in contact with the intermediate holding member 13 at a mechanical end on an infinite distance side in a moving range of the lens holder 4 in the direction of the optical axis (at a reference position on an image pickup element 6 side in the moving range). The lens holder 4 (and the image pickup lens 1) can be driven in the direction of the optical axis by control of the AF coil 14. This makes it possible to attain an automatic focusing function.

The intermediate holding member 13 is supported by four suspension wires 16, with respect to the base 19, so as to be driven in two axial directions perpendicular to the direction of the optical axis. The suspension wires 16 are, for example, long and thin metallic wires and extend parallel to the optical axis. Note that a longitudinal direction of the suspension wires 16 does not necessarily coincide with the direction of the optical axis. For example, four suspension wires 16 may be slightly tilted and arranged to have an inverted v shape. That is, the suspension wires 16 may obliquely extend with respect to the optical axis. The OIS coils (driving means) 18 are fixed inside the cover 17. It is possible to drive the intermediate holding member 13, the permanent magnet 15, the AF springs 12a and 12b, the lens holder 4, the AF coil 14, the lens barrel 2, the image pickup lens 1, etc. integrally in a direction perpendicular to the optical axis, by controlling the OIS coils 18. This makes it possible to attain an image stabilizing function.

Note that, in the specification of the present invention, a section that is driven in the direction perpendicular to the optical axis of the image pickup lens 1 is referred to as an OIS movable section (movable section), and a section excluding the OIS movable section is referred to as an OIS fixed section (fixed section). That is, the OIS movable section includes the image pickup lens 1, the lens barrel 2, the lens holder 4, the AF springs 12a and 12b, the intermediate holding member 13, and the AF coil 14. Meanwhile, the OIS fixed section includes the cover 17, the OIS coils 18, and the base 19.

(Configuration of Image Pickup Lens etc.)

In Embodiment 1, a part of the lens barrel 2 is in an opening 19a of the base 19 when the lens barrel 2 is set in the lens drive device 5. This configuration is often employed because it is difficult to have a sufficiently-large flange focus (a distance from a lower end surface of the lens barrel 2 to the image pickup element 6) of the image pickup lens 1. The lens drive device 5 is mounted on the sensor cover 8.

The sensor cover 8 is provided so as to cover the entire image pickup element 6. This sensor cover has a reference surface formed at an end of a protrusion 8a and the reference surface is in contact with the image pickup element 6. The sensor cover 8 is provided with an opening 8b on the image pickup lens 1 side. The opening 8b is closed by the glass substrate 9 having an infrared cutoff function. The image pickup element 6 is mounted on the substrate 7. The sensor cover 8 and the substrate 7 are fixed by bonding to each other in such a manner that a gap produced by tolerance between the sensor cover 8 and the substrate 7 is filled with an adhesive 20.

The lens barrel 2 and the lens holder 4 are fixed with the adhesive 3 so that the lens barrel 2 is positioned at a predetermined position while the lens holder 4 is positioned at the mechanical end on the infinite distance side. For example, a gap of approximately 10 μm is formed between the lens barrel 2 and the sensor cover 8. When the lens barrel 2 is to be positioned so that the gap of approximately 10 μm is formed as described above, the lens barrel 2 and the lens holder 4 should be bonded while the position of the lens barrel 2 is kept by using a jig.

Next, the following discusses an attachment position of the lens barrel 2 to the lens holder 4. In regard to a position of the image pickup lens 1, it is preferably to set a distance between the image pickup lens 1 and the image pickup element 6 so that the image pickup lens 1 at the mechanical end on the infinite distance side comes into focus. However, because of the presence of tolerance such as tolerance on the attachment position of the image pickup lens 1 to the lens barrel 2 and tolerance on thickness of the sensor cover 8, and variation in the above-described members, some errors may remain in a case where the image pickup lens 1 is positioned mechanically without a focus adjustment.

In order to find an in-focus position in a range of a stroke of the lens drive device 5 even in a state in which such an error remains, it is preferable to attach the image pickup lens 1 to a position slightly closer to the image pickup element 6 as compared to a position of a designed center value of the in-focus position. An amount of this shift is called over infinity. However, in a case where the over infinity is set to be large, the stroke of the lens drive device 5 increases accordingly. Thus, the over infinity is required to be the minimum. In view of an accumulated total of the various types of tolerance above, for example, an appropriate over infinity is approximately 25 μm. However, this value is affected by manufacture tolerance and assembly tolerance of the members. Thus, it is preferable to set a value of the over infinity to the minimum value suitable for an actual condition.

Note that, in Embodiment 1, while the reference surface on a lower side of the sensor cover 8 directly abuts against the image pickup element 6, the sensor cover 8 having a more accurate thickness is used, and the lens barrel 2 is positioned with a high accuracy on an upper surface of the sensor cover 8 (namely, a lower surface of the lens drive device 5). Thus, the over infinity of approximately 25 μm is said to be sufficient in Embodiment 1. In Embodiment 1, the lens barrel 2 is attached to a position closer to the image pickup element by only 25 μm from a position where an object at infinity is focused, and, in this state, a gap is present between the sensor cover 8 and the lens barrel 2.

(Elastic Body)

The feature of Embodiment 1 is (i) having a structure, as illustrated in FIG. 3, in which a part of the upper AF spring 12a protrudes (extends) beyond an outer periphery of the intermediate holding member 13, thereby forming an arm portion (extending portion) 12c which has flexibility, and at a substantial end position of the arm portion 12c, a top of the suspension wire 16 is fixed and (ii) defining a relationship between a spring constant of the arm portion 12c and a spring constant of the suspension wire 16 in the longitudinal direction of the suspension wire 16 so that the suspension wire 16 is neither permanently deformed in the longitudinal direction nor buckled in a compression direction. Note that the relationship between these spring constants is described later. Furthermore, it is possible to suppress a resonance peak by providing a damper material 11 to a part of the arm portion 12c.

Note that, in the present specification, the term "buckling" indicates a phenomenon that, in a case where compression stress is applied on a wire-like member (metal), this wire cannot contract any further and as a result, buckles in a radial direction perpendicular to a longitudinal direction of the wire. In addition, stress that causes the buckling is called buckling stress.

Furthermore, in the present specification, the term "permanent deformation" indicates a phenomenon that, in a case where tension stress is applied on a wire-like member, a strained wire cannot be restored to its former state even after the stress is removed. In addition, yield stress is stress that causes the permanent deformation at the time when the stress is no longer proportional to a deformation amount.

The arm portion 12c serves as an elastic body to prevent buckling and permanent deformation of the suspension wire 16. The arm portion 12c is not particularly limited, but can be made of, for example, metal, plastic, or the like. More preferably, the arm portion 12c is made of material that can make the spring constant sufficiently small and that does not plastically deform even when approximately 150 μm deformation occurs. Further, in a case where the arm portion 12c and the suspension wire 16 are joined together with solder, it is preferable that the arm portion 12c is made of metal.

In normal usage, the deformation amount as a result of bending of the arm portion 12c is negligible. However, in a case where too large force works due to an impact caused by a drop etc., the OIS movable section including the intermediate holding member 13 is subjected to inertia force in the direction of the optical axis. At a lower part of the intermediate holding member 13, the base 19 is provided. This base 19 serves as a stopper (locking member) that defines a moving range of the intermediate holding member 13 (the OIS movable section) in the direction of the optical axis. Thus, it is possible to control displacement of the intermediate holding member 13 in the direction of the optical axis. However, in order to prevent the OIS movable section from coming into contact with the OIS fixed section, it is essential to provide a gap of approximately 100 μm to 150 μm between the OIS movable section and the OIS fixed section in consideration of an error in assembly etc. Because of this, a distance between the OIS movable section and the OIS fixed section may vary by approximately 150 μm. In a case where this deformation amount is to be borne only by contraction and stretch of the suspension wire 16, stress applied on the suspension wire 16 may exceed the buckling stress or yield stress of the suspension wire 16.

Note here that, in Embodiment 1, since the arm portion 12c bears a part of the deformation amount of the suspension wire 16, it is possible to reduce the deformation amount of the suspension wire 16 in the longitudinal direction thereof.

Figure 4:
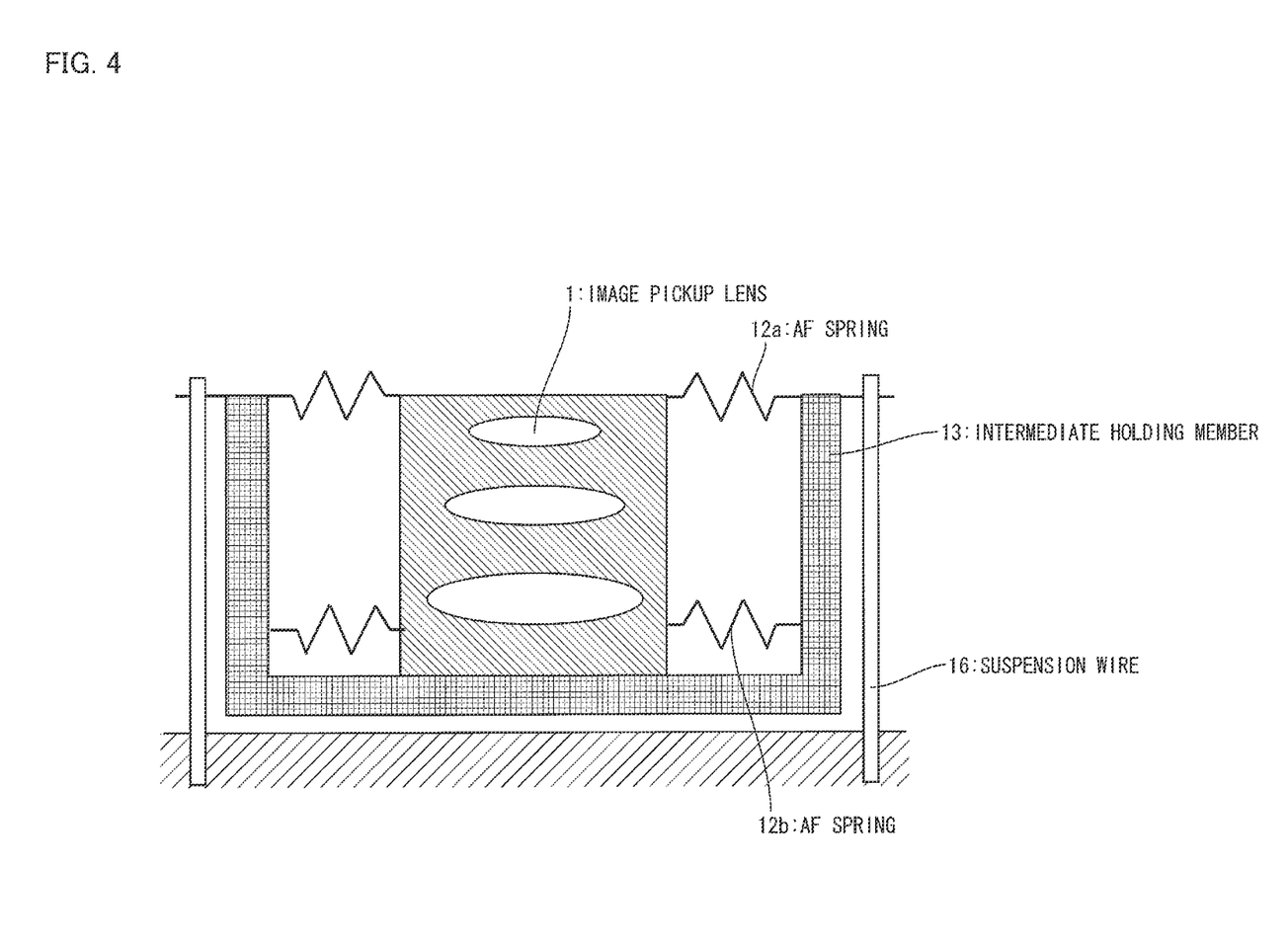
FIG. 4 is a view illustrating servo drive for an image stabilizing function in the camera module of one embodiment of the present invention.

Note that FIG. 4 provides a simplified illustration of only important components of the present invention. The lens holder 4 holding the image pickup lens 1 etc. is supported by the two upper and lower AF springs 12a and 12b, and a part of the upper AF spring 12a protrudes beyond the intermediate holding member 13. The suspension wire 16 is fixed to the protruding arm portion 12c.

(Spring Constant)

Figure 5:
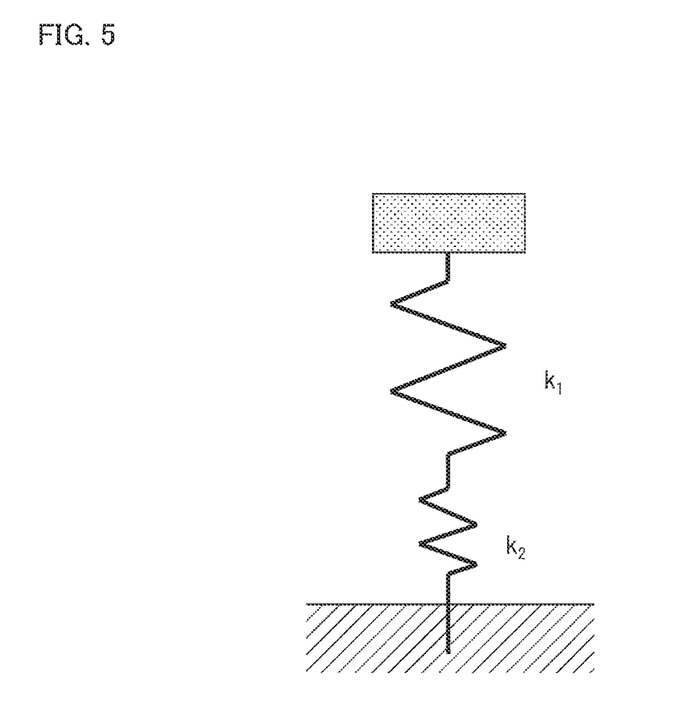
FIG. 5 is a view illustrating a state in which a suspension wire and an elastic body are connected to each other.

Next, the following discusses in more detail drop impact resistance of the camera module 50 of Embodiment 1 of the present invention. FIG. 5 shows a relationship between the respective spring constants of any of the suspension wire 16 and the arm portion (elastic body) 12c. FIG. 5 is a view schematically illustrating a spring configuration of the arm portion 12c and the suspension wire 16 in the longitudinal direction. $k_1$ is a spring constant of the arm portion 12c of the upper AF spring 12a, and $k_2$ is a spring constant of the suspension wire 16 in the longitudinal direction. This substantially means having a structure in which two springs $k_1$ and $k_2$ are connected to each other in series. Note that, in a case where the damper material 11 is applied to a part of the arm portion 12c, $k_1$ becomes a spring constant of a set of the arm portion 12c and the damper material. For simplification, the following description deals with only one suspension wire 16.

In the above structure, the spring constants are set to be $k_1 \ll k_2$. For example, $k_1$ is approximately $1 \times 10^3$ N/m, and $k_2$ is approximately $1 \times 10^5$ N/m. Assuming that a total deformation amount as a result of a drop impact etc. is δ (e.g., approximately 150 μm which is a size of the gap between the intermediate holding member 13 and the base 19), the deformation amount of each of the springs is inversely proportional to the spring constant of each of the springs. The deformation amount of each of the springs can be calculated as shown in the following formulae (1) and (2).

The deformation amount of the elastic body (the arm portion 12c) $\delta_1 = \delta k_2/(k_1+k_2) = 148.5$ μm   (1)

The deformation amount of the suspension wire 16 $\delta_2 = \delta k_1/(k_1+k_2) = 1.5$ μm   (2)

Further, force (F) required for deforming the suspension wire 16 by $\delta_2$ can be calculated as shown in the following formula (3).

$F = \delta k_1 k_2/(k_1+k_2) = 0.15$ N   (3)

Therefore, assuming that a cross-sectional area of the suspension wire 16 is A, stress defined by the deformation amount of the suspension wire 16 in the longitudinal direction can be calculated as shown in the following formula (4).

$\sigma = (\delta/A) k_1 k_2/(k_1+k_2) = 3 \times 10^7$ N/m²   (4)

It is essential that this σ does not exceed buckling stress $\sigma_e$ of the suspension wire 16. That is, the buckling stress matters because the buckling stress is usually smaller than the yield stress.

That is, (i) the deformation amount δ having an upper limit corresponding to the moving range, (ii) the cross-sectional area A, and (iii) the spring constants $k_1$ and $k_2$ are set to satisfy the following formula (5).

$\sigma_e > (\delta/A) k_1 k_2/(k_1+k_2)$   (5)

Note that, for the buckling stress, Euler's buckling stress is generally used as a guide. Euler's buckling stress is expressed by the following formula (6), where: C is a constant and in the case of a column with both ends fixed, C becomes 4; E is Young's modulus; and λ is a slenderness ratio.

$$\sigma_e = C\pi^2 E/\lambda^2 \qquad (6)$$

When Euler's buckling stress is calculated for one design example, a value of the buckling stress becomes approximately $1 \times 10^8$ N/m². However, a formula of Euler's buckling stress is for a case where an ideal vertical load is applied. However, since a load may be obliquely applied in reality, it is desirable to set the buckling stress with a certain level of margin.

In the present embodiment, the base 19 serves as a stopper (locking member), thereby defining the moving range of the intermediate holding member 13 (OIS movable section) in the direction of the optical axis. This moving range is divided and allotted to the deformation amount of the suspension wire 16 in the longitudinal direction and the deformation amount of the arm portion 12c, at a ratio corresponding to the respective spring constants of the suspension wire 16 and the arm portion 12c. Accordingly, the stress generated as a result of the deformation amount of the suspension wire 16 in the longitudinal direction does not exceed the buckling stress and the yield stress of the suspension wire 16. This makes it possible to prevent buckling and permanent deformation of the suspension wire 16, thereby giving drop impact resistance to the camera module 50.

Embodiment 2

According to Embodiment 1, the arm portion 12c which is a connecting section of the suspension wire 16 and the OIS movable section functions as an elastic body for preventing buckling and permanent deformation of the suspension wire 16. However, the present invention is not limited to this embodiment. Since the elastic body only needs to be connected to at least one end of the suspension wire 16, it is also possible to configure such that a connecting section of a suspension wire 16 and an OIS fixed section functions as an elastic body for preventing buckling and permanent deformation of the suspension wire 16. The following description discusses such a configuration as Embodiment 2 of the present invention.

Figure 6:
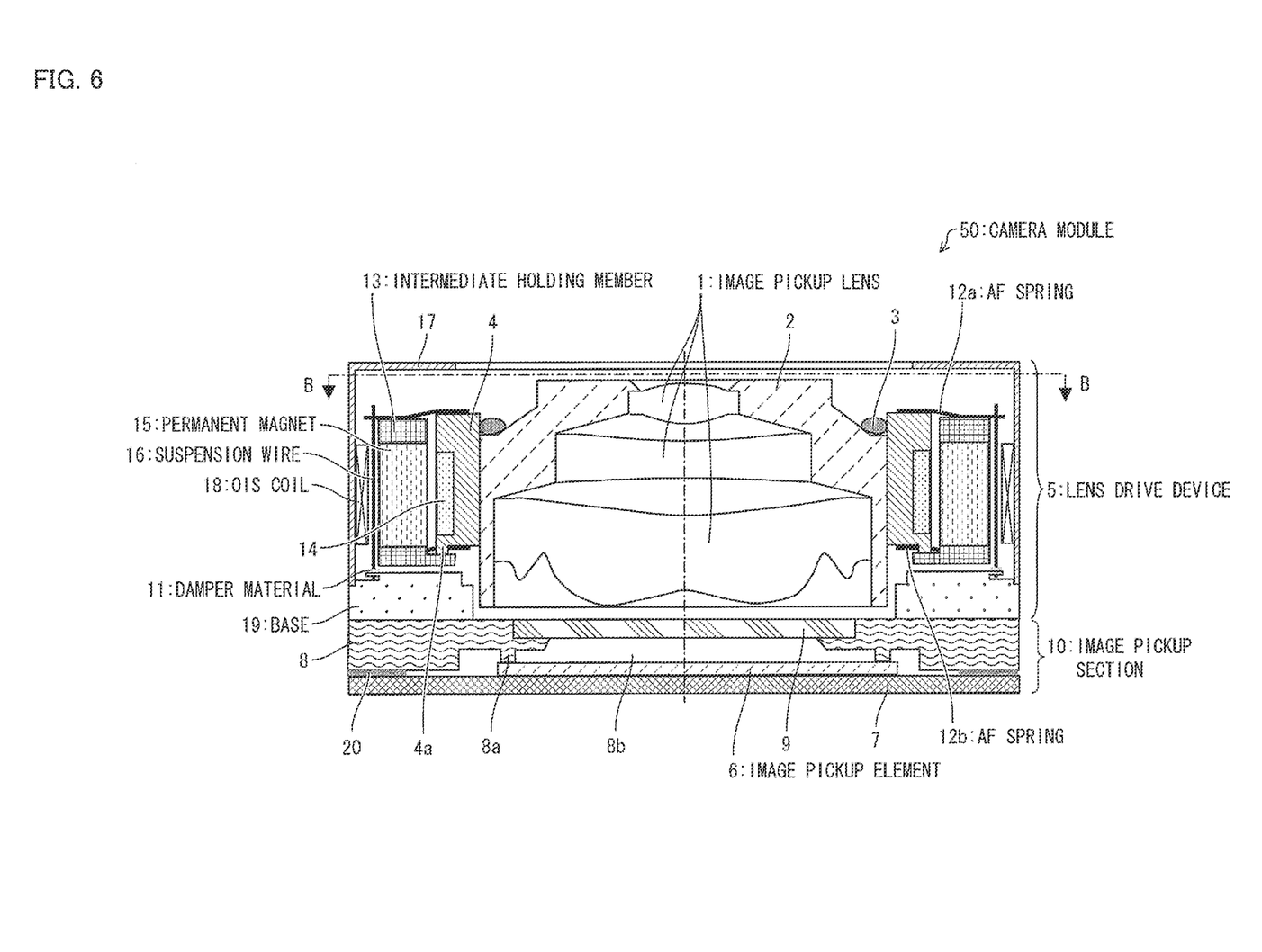
FIG. 6 is a cross-sectional view schematically illustrating a configuration of a camera module of another embodiment of the present invention.
Figure 7:
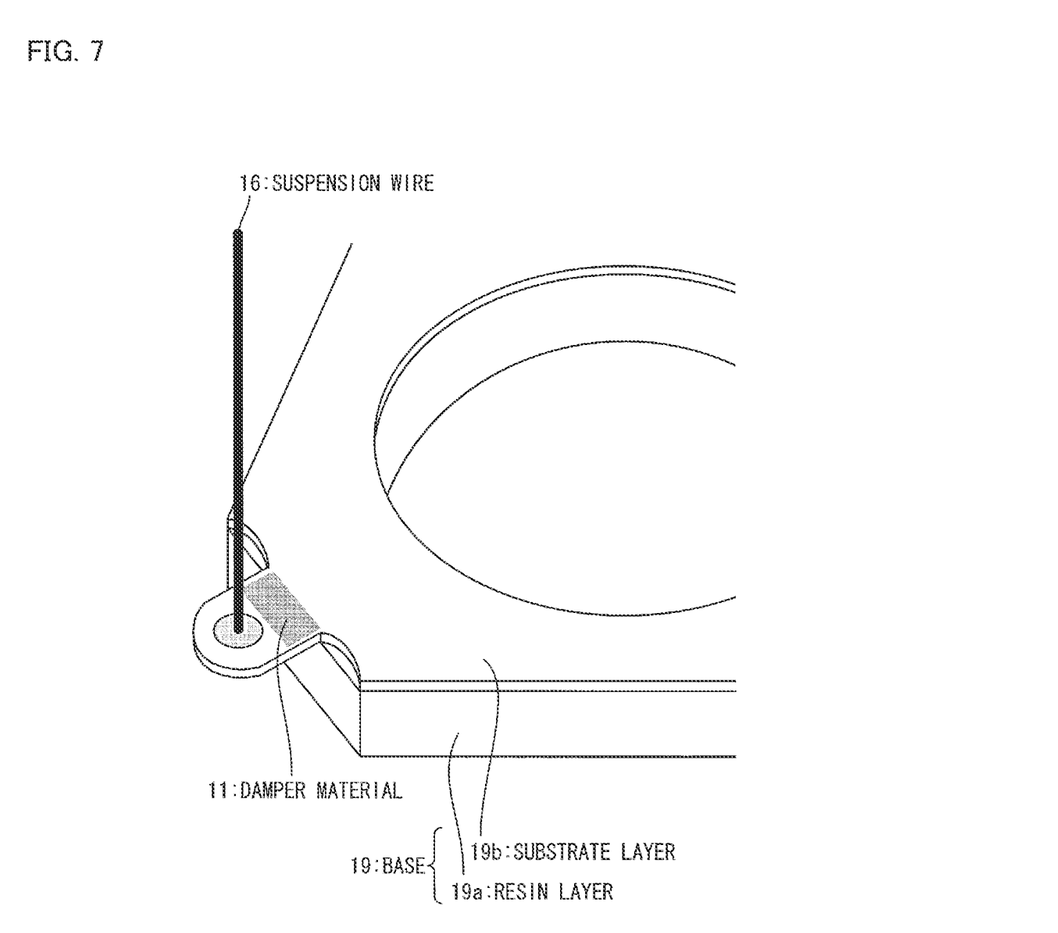
FIG. 7 is a view schematically illustrating a configuration example of an elastic body and a damper material of another embodiment of the present invention.

FIG. 6 is a cross-sectional view schematically illustrating a configuration of a camera module 50 of Embodiment 2. FIG. 7 is an enlarged view illustrating a configuration around the connecting section of the suspension wire 16 and the OIS fixed section of the camera module 50 shown in FIG. 6. Note that members that have functions and operations identical to those in Embodiment 1 are given identical reference numerals, and are not described repeatedly.

According to Embodiment 2, a base 19 has a double-layered structure in which a substrate layer 19b is supported by a resin layer 19a (see FIGS. 6 and 7). It is possible to provide a flexible portion to the substrate layer 19b by partly removing such a support by the resin layer 19a from the substrate layer 19b. Furthermore, it is possible to fix the suspension wire 16 to the flexible portion and thereby cause the flexible portion to serve as the elastic body for preventing buckling and permanent deformation of the suspension wire 16.

The substrate layer 19b used as the elastic body for preventing buckling and permanent deformation of the suspension wire 16 is not particularly limited as with the arm portion 12c, but can be made of, for example, metal, plastic, or the like. More preferably, the substrate layer 19b has a sufficiently small spring constant and is made of a material that is not plastically deformed even when approximately 150 μm deformation occurs. Furthermore, in a case where the substrate layer 19b and the suspension wire 16 are joined together by solder, it is preferable that the substrate layer 19b be made of metal. Moreover, a circuit substrate (glass epoxy substrate etc.) on which a metallic pattern is made, or the like may also be used as the substrate layer 19b.

Also in Embodiment 2, as with Embodiment 1, the base 19 serves as a stopper and thereby defines a moving range of an intermediate holding member 13 in a direction of an optical axis. This moving range is divided and allotted to (i) a deformation amount of the suspension wire 16 in a longitudinal direction of the suspension wire 16 and (ii) a deformation amount of the flexible portion of the substrate layer 19b, at a ratio corresponding to respective spring constants of the suspension wire 16 and the flexible portion of the substrate layer 19b. Accordingly, the stress generated as a result of the deformation amount of the suspension wire 16 in the longitudinal direction does not exceed the buckling stress and yield stress of the suspension wire 16. This makes it possible to prevent buckling and permanent deformation of the suspension wire 16, thereby giving drop impact resistance to the camera module 50.

Note that, as with Embodiment 1, it is also possible to reduce the risk of oscillation of a servo system by attaching a damper material 11 to the elastic body (i.e., the flexible portion of the substrate layer 19b in Embodiment 2) for preventing buckling and permanent deformation of the suspension wire 16.

The present invention is not limited to the descriptions of embodiments above, but may be altered by a skilled person within the scope of the claims. That is, an embodiment based on a common general technical knowledge or a proper combination of such embodiments is also encompassed in the scope of the present invention.

CONCLUSION

The camera module of the present invention is a camera module which has an image stabilizing function including: an image pickup element that converts an optical signal into an electric signal; and a lens drive device for driving an image pickup lens through which light enters the image pickup element, the image pickup lens being driven in a direction of an optical axis and two axial directions perpendicular to the optical axis, the lens drive device including: a movable section including the image pickup lens; a fixed section surrounding the movable section; driving means for driving the movable section in a direction perpendicular to the optical axis of the image pickup lens; a suspension wire that extends parallel or obliquely to the optical axis and supports the movable section so that the movable section is driven in the direction perpendicular to the optical axis; an elastic body which is connected to at least one end of the suspension wire and prevents buckling and permanent deformation of the suspension wire; and a locking member that defines a moving range of the movable section in the direction of the optical axis, the suspension wire and the elastic body each having a spring constant that is set so that a maximum value of stress does not exceed buckling stress and yield stress of the suspension wire, the maximum value of stress being defined by a deformation amount in a longitudinal direction of the suspension wire at the time when the movable section moves in the moving range.

According to the above configuration, the locking member defines the moving range of the movable section in the direction of the optical axis, so that a total deformation amount in this moving range is divided and allotted to a longitudinal direction of the suspension wire and the elastic body, at a ratio corresponding to respective spring constant of the suspension wire and the elastic body. This makes it possible to reduce the deformation amount of the suspension wire. Furthermore, it is possible to calculate stress defined by the deformation amount of the suspension wire in the longitudinal direction. That is, by setting the ratio of the respective spring constants of the suspension wire and the elastic body to an appropriate value, it is possible to prevent the stress defined by the deformation amount in the longitudinal direction of the suspension wire from exceeding the buckling stress and yield stress of the suspension wire.

Because the configuration above makes it possible to successfully prevent buckling and permanent deformation of the suspension wire, it is possible to more preferably ensure drop impact resistance.

According to one embodiment, the camera module having the image stabilizing function of the present invention is preferably configured such that the movable section includes a plate spring member that supports the image pickup lens; and the elastic body is made of an extending portion of the plate spring member, the extending portion extending toward the fixed section.

According to the above configuration, the suspension wire is fixed to the extending portion of the plate spring member included in the movable section, and the extending portion serves as the elastic body for preventing buckling and permanent deformation of the suspension wire. That is, the above configuration makes it possible to preferably configure a camera module that includes the suspension wire connected to the elastic body and that has the image stabilizing mechanism.

According to one embodiment, the camera module having the image stabilizing function of the present invention is preferably configured such that, in addition to the above configuration, the fixed section includes a substrate provided with a flexible portion, and the elastic body is made of the flexible portion.

According to the above configuration, the suspension wire is fixed to the flexible portion of the substrate included in the fixed section, and the flexible portion serves as the elastic body for preventing buckling and permanent deformation of the suspension wire. That is, the above configuration makes it possible to preferably configure a camera module that includes the suspension wire connected to the elastic body and that has the image stabilizing mechanism.

INDUSTRIAL APPLICABILITY

The present invention is applicable to a manufacture field of camera modules. Particularly, the present invention can be preferably applied to a manufacture field of camera modules to be mounted in various electric apparatuses including communication devices such as a mobile terminal.

REFERENCE SIGNS LIST

1 Image pickup lens
2 Lens barrel
3, 20 Adhesive
4 Lens holder
5 Lens drive device
6 Image pickup element
7 Substrate
8 Sensor cover
9 Glass substrate
10 Image pickup section
11 Damper material
12a, 12b AF spring (Plate spring member)
12c Arm portion (Extending portion, elastic body)
13 Intermediate holding member
14 AF coil
15 Permanent magnet
16 Suspension wire
17 Cover
18 OIS coil (Driving means)
19 Base (Locking member)
19a Resin layer
19b Substrate layer (Elastic body)
50 Camera module

The invention claimed is:

1. A camera module which has an image stabilizing function comprising:
an image pickup element that converts an optical signal into an electric signal; and
a lens drive device for driving an image pickup lens through which light enters the image pickup element, the image pickup lens being driven in a direction of an optical axis and two axial directions perpendicular to the optical axis,
the lens drive device including:
a movable section including the image pickup lens;
a fixed section surrounding the movable section;
driving means for driving the movable section in a direction perpendicular to the optical axis of the image pickup lens;
a suspension wire that extends parallel or obliquely to the optical axis and supports the movable section so that the movable section is driven in the direction perpendicular to the optical axis;
an elastic body which is connected to at least one end of the suspension wire and prevents buckling of the suspension wire; and
a locking member that defines a moving range of the movable section in the direction of the optical axis,
the suspension wire and the elastic body each having a spring constant that is set so that a maximum value of stress does not exceed buckling stress and yield stress of the suspension wire, the maximum value of stress being defined by a deformation amount in a longitudinal direction of the suspension wire at the time when the movable section moves in the moving range.

2. The camera module as set forth in claim 1, wherein:
the movable section includes a plate spring member that supports the image pickup lens; and
the elastic body is made of an extending portion of the plate spring member, the extending portion extending toward the fixed section.

3. The camera module as set forth in claim 1, wherein:
the fixed section includes a substrate provided with a flexible portion; and
the elastic body is made of the flexible portion.

* * * * *